April 13, 1954

C. JOHNSON 2,675,204

NONCORRODIBLE FLUID-PRESSURE OPERATED VALVE

Filed Sept. 30, 1948

INVENTOR.
CLARENCE JOHNSON
BY Ralph C. Dustin

April 13, 1954

C. JOHNSON 2,675,204

NONCORRODIBLE FLUID-PRESSURE OPERATED VALVE

Filed Sept. 30, 1948

INVENTOR.
CLARENCE JOHNSON
BY Ralph C. Dustin

Patented Apr. 13, 1954

2,675,204

UNITED STATES PATENT OFFICE 2,675,204

NONCORRODIBLE FLUID-PRESSURE OPERATED VALVE

Clarence Johnson, Orfordville, Wis.

Application September 30, 1948, Serial No. 52,100

6 Claims. (Cl. 251—25)

This invention relates to valve mechanisms that are adapted especially for use in controlling the flow of corrosive fluids.

A valve mechanism for controlling the flow of a corrosive fluid may include in a preferred form of my invention a valve member connected to a flexible diaphragm sealingly engaging a valve block, the valve member cooperating with a valve seat to control the flow of fluid through passage means in the block. The diaphragm, the valve member and the valve block are the only parts of the mechanism contacted by the fluid and may be made of a material, such as Saran, which is unaffected by the corrosive tendencies of the fluid. For regulating the position of the valve, there may be provided a housing connected to the valve block and supporting a fluid actuated member which is connected to a stem for the valve so as to actuate the latter. A spring acting between an adjustable abutment and the fluid actuated member may be provided for urging the valve member in one direction relative to its seat, and means supplying pressure fluid to the other side of the fluid actuated member may be provided for moving the valve in the opposite direction. The valve stem is desirably arranged so that the connection between the valve member and the diaphragm may be tightened at any time by adjustable means to maintain sealing engagement between the parts.

An object of my invention is to provide an improved valve mechanism for controlling the flow of a corrosive fluid. Another object is to provide an improved valve mechanism for controlling the flow of a corrosive fluid and having all of its parts contacted by the fluid controlled made of a material which is unaffected by corrosive tendencies of the fluid. Still another object is to provide a valve mechanism having a valve member connected to a flexible member sealingly engaging a valve block, and having means operatively connected to the valve member for adjusting its position within the block. Yet another object is to provide improved means for adjustably connecting a valve member to a diaphragm which engages a housing to form a sealed valve chamber therein. These and other objects will appear more fully in the course of the following description.

In the accompanying drawings there are shown for purposes of illustration two forms which my invention may assume in practice.

Figure 1:
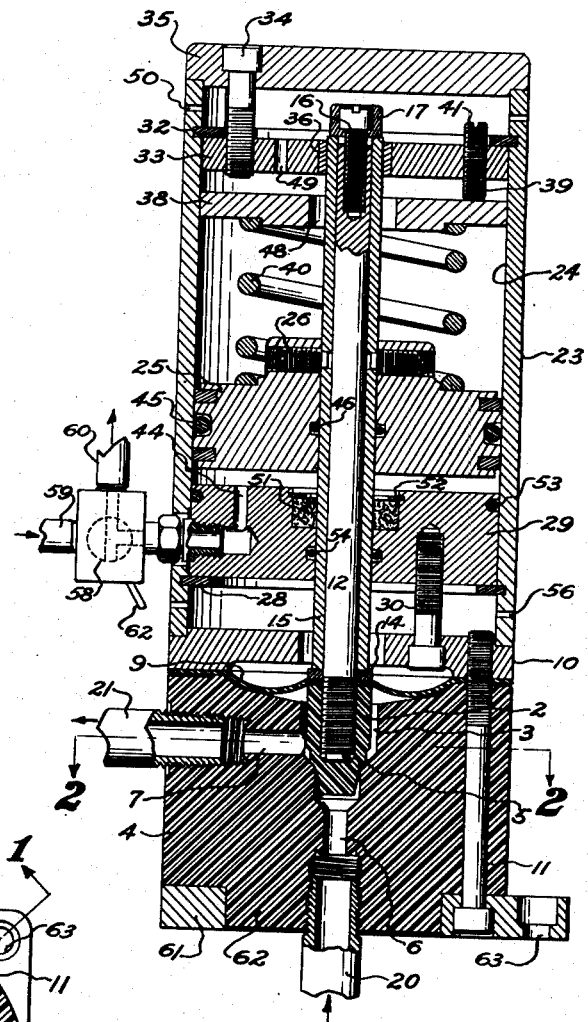
Fig. 1 is a vertical sectional view of my improved valve mechanism taken on the planes of the line 1—1 of Fig. 2.
Figure 3:
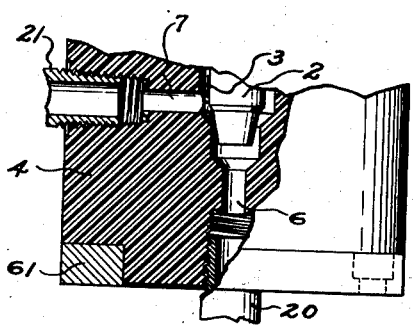
Fig. 3 is a fragmentary sectional view similar to Fig. 1 but showing the valve in open position.
Figure 2:
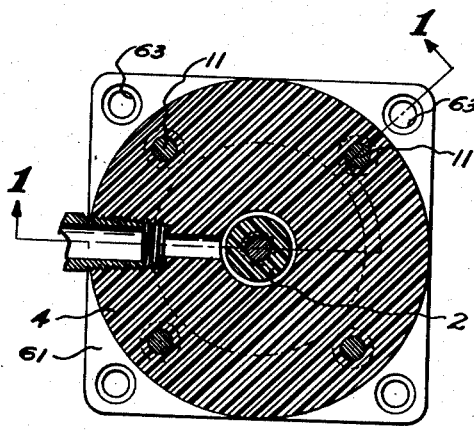
Fig. 2 is a horizontal cross section taken on the plane of the line 2—2 of Fig. 1.

Referring to the drawings, and more particularly Figs. 1 to 3, it will be noted that there is shown an improved valve mechanism generally designated 1 including a valve member 2 extending loosely into a recess 3 in a valve block 4 and cooperating with a valve seat 5 at the bottom of the recess for controlling the flow of fluid from a supply passage 6 to a discharge passage 7. A diaphragm 9 overlies the recess 3 and is clamped at its outer edges between the valve block and an annular plate 10 which are held together by screws 11. The diaphragm covering the recess 3 forms an enclosed chamber in which the valve member operates to control the flow of fluid. The valve member 2 is threaded on the end of a rod 12 extending through an opening in the diaphragm, and an annular member 14 surrounds the rod at the outer side of the diaphragm and is held by a tubular member 15 against the diaphragm for effecting a sealing engagement of the latter with the valve member. The valve block 4, the diaphragm 9 and the valve member 2 are made of a plastic material, such as Saran, which is unaffected by corrosive fluids but is relatively soft rendering it unsuitable for guide bearing service and subject, upon repeated operation of the valve, to cold flow and possible permanent deformation. It is necessary, therefore, that the design be such that these Saran parts are subject to a minimum of mechanical stress. Furthermore, because of the corrosive nature of the fluids to be handled, means accessible to the operator must be provided for adjusting the means for sealingly clamping the diaphragm to the valve members with the valve in service to assure a fluid-tight seal in the event the diaphragm has undergone cold flow. Exposed screws 11 provide the means for adjusting the clamping relation around the periphery of the block 4 and diaphragm 9 and an adjusting screw 16 threaded into an opening in the outer end of the rod 12 and provided with an enlarged head which rests on a collar 17 engaging the outer end of tubular member 15 is provided to vary the clamping relation between the inner portion of diaphragm 9 and valve member 2. As shown in Fig. 1, the outer end of the tubular member extends a short distance beyond the end of the rod so that a tightening of the screw will effect relative movement between the rod and the tubular member to force the valve member 2 and the annular member 14 into a fluid tight clamping engagement with the diaphragm.

This arrangement provides for adjustment of the sealing means without subjecting the relatively fragile diaphragm to twisting or rotational strains. A fluid which corrodes most metals is supplied at a very low pressure through a conduit 20 to the passage 6. When the valve member 2 is unseated, the fluid passes through the passage 7 to a conduit 21 which conducts the fluid to some point of use. The conduits 20 and 21 are made of a material similar to that of the valve block and the valve member. The pressure of the fluid for which the valve mechanism is adapted for use is so low that its action on the diaphragm has no appreciable effect on the operation of the valve.

Resting upon the plate 10 is a cylinder 23 having a bore 24 reciprocably receiving a piston 25. Screws 26 extend through radial openings in the piston and have reduced inner end portions projectng into openings in the tubular member 15 so as to connect the latter for movement with the piston. Near the lower end of the cylinder is a split ring 28 fitting within an annular groove in the wall of the bore 24, and a cylinder head 29 rests upon this ring and is held firmly in engagement therewith by screws 30 extending through the plate 10 and threaded into openings in the cylinder head. Near the upper end of the cylinder is a split ring 32 fitting within an annular groove in the wall of the bore 24, and a circular plate 33 fits within the bore and is held firmly against the ring 32 by screws 34 extending through openings in a head 35 closing the outer end of the cylinder bore. The tubular member 15 is reciprocably supported by a bushing 36 carried by the plate 33, and the outer end of the tubular member extends into the space between the head 35 and the plate 33 so that the screw 16 may be adjusted on removal of the head. Received within the bore 24 beneath the plate 33 is an abutment member 38 held in engagement with screws 39 by a spring 40 acting between the abutment member and the piston 25. The screws 39 are threaded through openings in the plate 33 and are provided at their upper ends with screw driver slots 41 whereby manual adjustment may be obtained when the head 35 is removed.

For moving the piston 25 upwardly against the action of the spring 40 there are provided passage means 44 in the cylinder head 29 adapted to conduct pressure fluid to the cylinder bore 24 beneath the piston. To prevent the escape of pressure fluid past the piston there are provided a packing ring 45 fitting within an annular groove in the outer periphery of the piston and another packing ring 46 fitting within an annular groove in the piston adjacent the tubular member 15. The space above the piston is connected through a central opening 48 in the abutment member 38, openings 49 in the plate 33, and ports 50 in the cylinder 23 to the atmosphere for venting any pressure fluid that may escape past the piston. A recess in the lower cylinder head surrounding the tubular member 15 is filled with a packing material 51, such as felt, which is held in place by a split ring 52. Packing rings 53 and 54 are provided in annular grooves in the cylinder head adjacent the cylinder and the tubular member for preventing the escape of pressure fluid toward the lower end of the cylinder. Extending through the cylinder walls below the head 29 are vent ports 56 for preventing a building up of pressure at the upper side of the diaphragm. The passage means 44 may be connected by a manually operated valve 58 to a pressure fluid supply connection 59 or to an exhaust connection 60.

The valve 58, as shown, is in a position for venting pressure fluid from the lower end of the piston 25 to the connection 60. The piston 24 is then held in its lower position by the spring 40 for seating the valve 2. A manually operable lever 62 is provided for rotating the valve in a clockwise direction to connect the passage means 44 to the supply connection 59 and effect a movement of the piston 25 to unseat the valve 25. If the connection between the valve member and the diaphragm becomes loose, the cylinder head 35 may be removed after taking out the screws 34, and the screws 16 may be turned so that the rod 12 is raised while the tubular member 15 is forced downwardly against the annular member 14. To vary the responsiveness of the valve to the pressure supplied, it is only necessary to adjust the screws 41 for varying the position of the abutment 38 to place the spring 40 under more or less compression.

For supporting the valve mechanism in an upright position, there is provided a base plate 61 having a central opening which receives a reduced portion 62 of the valve block 4, and the screws 11 extend through openings in the base plate as shown for holding it in place. Openings 63 are provided in the base plate to receive screws or bolts for securing the mechanism on a suitable supporting structure, not shown.

Figure 4:
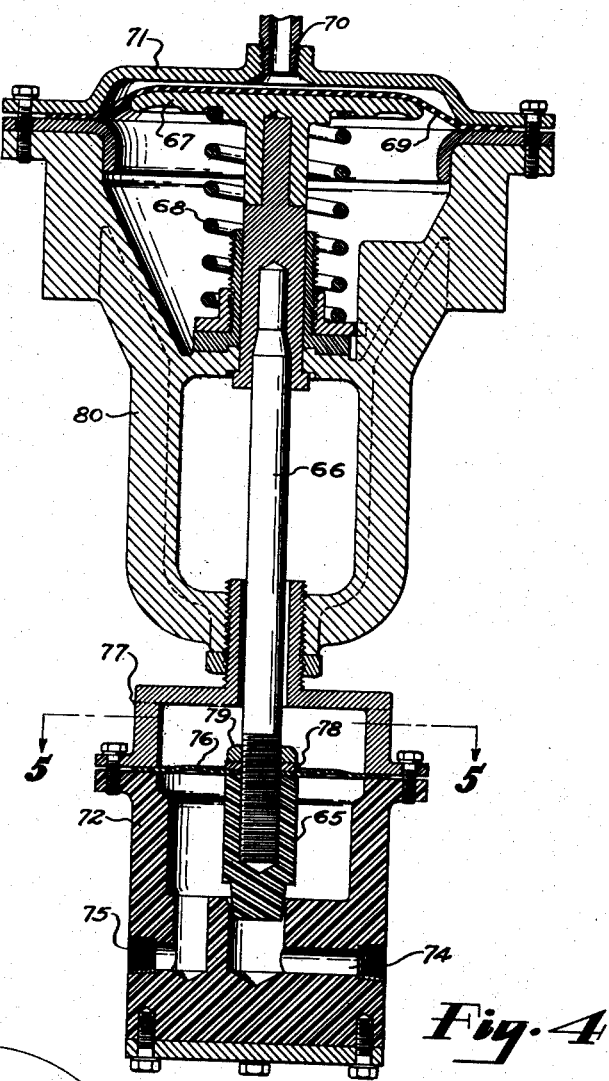
Fig. 4 is a vertical sectional view of another form of my invention.
Figure 5:
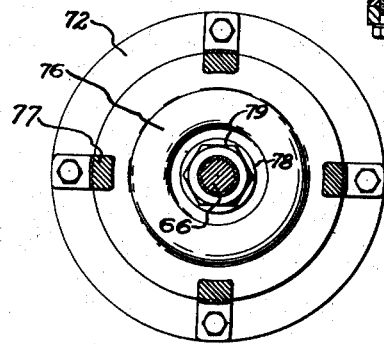
Fig. 5 is a horizontal sectional view taken on the plane of the line 5—5 of Fig. 4.

In Fig. 4 there is shown another form of my valve mechanism in which a valve member 65 is connected to a rod 66 carrying an abutment member 67 that is yieldingly held by a spring 68 against the lower side of a diaphragm 69. Pressure fluid may be supplied through a port 70 in a casing 71 to the upper side of the diaphragm for moving the valve against the action of the spring 68 into its closed position. A valve block 72 provides a valve seat with which the valve member cooperates for controlling the flow of fluid through passage means 74 and 75. A diaphragm 76 is clamped at its outer edges between the valve block and a cap 77, and the central portion of the diaphragm is clamped between the valve 65 and an annular member 78 by a nut 79 threaded on the rod 66. Openings are provided in the cap 77, as shown, so that the nut 79 may be adjusted when desired to effect a clamping of the diaphragm. A framework 80 is adjustably connected to the cap 77 and provides a support for the diaphragm housing 71.

While there are disclosed two forms which my invention may assume in practice, it will be understood that it may be modified and embodied in various other forms without departing from its spirit or the scope of the appended claims.

What I claim as new and desire to secure by Letters Patent of the United States, is:

1. A valve mechanism for controlling the flow of highly corrosive fluids comprising, in combination, a valve block having a recess, a diaphragm covering said recess to form a closed chamber, means for clamping said diaphragm at its outer edges to said valve block, fluid supply and discharge passages opening through said block into said recess, a valve member received within said chamber and cooperating with a valve seat on said block for controlling the flow of said fluid through said passages, said valve block, said diaphragm and said valve member made of a non-corrosive material, a rod extending through an opening in said diaphragm and received in said valve member which completely surrounds the portion of said rod in said chamber, means including a tubular member surrounding said rod and acting on said diaphragm at the side opposite said valve member, means accessible with the valve in operable assembly including a screw threaded into an opening in the outer end of said rod and acting on the end of said tubular member for effecting a clamping of said diaphragm between said valve member and said tubular member, fluid pressure responsive means operatively connected to said tubular member for axially positioning said valve member and said rod as a unit relative to said seat, and supporting structure surrounding a portion of said tubular member for guiding the latter in its movement relative to said seat.

2. A valve mechanism comprising, in combination, a valve block having a recess, a diaphragm covering said recess to form a closed chamber, means for clamping said diaphragm at its outer edges to said valve block, fluid supply and discharge passages opening through said block into said recess, a valve member received within said chamber and cooperating with a valve seat on said block for controlling the flow of fluid through said passages, said valve block, said diaphragm and said valve member made of a non-corrosive material, a rod extending through an opening in said diaphragm and connected to said valve member, means including a tubular member surrounding said rod and acting on said diaphragm at the side opposite said valve member, adjustable means for effecting a relative longitudinal movement between said rod and said tubular member so as to force said diaphragm into fluidtight engagement with said valve member, a casing mounted upon said valve block and having a bore through which said rod and tubular member extend, a piston reciprocably received within said bore and operatively connected to said tubular member, a spring acting between said piston and an adjustable abutment within said bore, means for adjusting the position of said abutment, and means for connecting said bore at the other side of said piston selectively to a pressure fluid supply and to exhaust.

3. A valve mechanism comprising, in combination, a valve block having a recess, a diaphragm covering said recess to form a closed chamber, means for clamping said diaphragm at its outer edges to said valve block, fluid supply and discharge passages opening through said valve block into said recess, a valve member received within said chamber and cooperating with a valve seat on said block for controlling the flow of fluid through said passages, said valve block, said diaphragm and said valve member made of a non-corrosive material, a rod extending through an opening in said diaphragm and connected to said valve member, means including a tubular member surrounding said rod and acting on said diaphragm at the side opposite said valve member, means including a screw threaded into an opening in the outer end of said rod and acting on said tubular member for effecting a fluidtight engagement between said diaphragm and said valve member, a cylinder attached to said valve block and having a bore through which said rod and tubular member extend, a piston reciprocably received within said bore, means for attaching said piston to said tubular member, a cylinder head closing the lower end of said bore, means for connecting the space at the lower side of said piston selectively to pressure fluid supply and to exhaust, an adjustable abutment within said bore at the upper side of said piston, and a spring acting between said abutment and said piston.

4. The valve mechanism of claim 3 including a plate fixed within said bore adjacent its upper end and carrying a bearing providing a sliding support for said tubular member, and screws threaded through openings in said plate and engaging said abutment.

5. A valve mechanism for handling highly corrosive fluids and having means for clampingly sealing and resealing said valve mechanism while in operation to prevent escape of corrosive fluid to the surrounding atmosphere comprising a plastic valve block having a recess in one face terminating in a peripheral clamping face and a centrally located valve seat and having inlet and outlet ports leading into said recess and separated from one another by said valve seat, said plastic block having a tendency to cold flow under continued application of high clamping pressure thereto and produce leaks; a diaphragm of similar plastic material overlying said one face and having a through opening adapted to be aligned with said valve seat and a peripheral clamping area overlying said clamping face; a valve member of similar plastic material disposed in said recess in operative relation to said valve seat and adapted to cooperate with said valve seat to prevent fluid flow from said inlet to said outlet and having a tapped recess in an end face in coaxial alignment with said diaphragm opening to threadedly receive one end of an operating valve stem; a valve stem having a threaded end extending through said diaphragm opening and threadedly engaged in said tapped opening of said valve member and protruding exteriorly from said diaphragm; take-up means adjustably carried by said stem exteriorly of said diaphragm and adapted to clampingly secure said diaphragm to said valve member in surrounding sealing relation to said valve stem whereby the valve members exposed to corrosive fluid are all formed of non-corrosive material; and clamping means accessible from the exterior of said body for sealingly clamping said diaphragm to said clamping face of said body in surrounding relation to said recess, said last named means and said take-up means together providing exteriorly accessible means to compensate for cold flow of said valve body and diaphragm and to eliminate leaks developed in use without disrupting operation of said valve mechanism.

6. A valve mechanism according to claim 5 wherein said clamping means comprises a cap member having open sides and supporting an open framework terminating at its upper end in an annular clamp face, said cap member resting upon the peripheral margin of said diaphragm, clamping said margins against said clamping face of said block and being secured to said block by screws; said valve stem comprises a rod extending through said diaphragm, said cap and said framework; said take-up means comprises a nut threaded on said rod within said cap and a washer for clamping said diaphragm against said valve member; and said framework supports a second diaphragm connected to said rod, a diaphragm chamber connected to a source of operating fluid and a spring adjustably supported by said framework and acting on said second diaphragm in opposition to said operating fluid.

References Cited in the file of this patent

UNITED STATES PATENTS

| Number | Name | Date |
|---|---|---|
| 822,500 | Frauenfelder | June 5, 1906 |
| 850,916 | Fitzgibbons | Apr. 23, 1907 |
| 922,016 | Milke | May 18, 1909 |
| 1,794,703 | Methudy | Mar. 3, 1931 |
| 1,933,085 | Barchard | Oct. 31, 1933 |
| 1,998,882 | Merrill | Apr. 23, 1935 |
| 2,355,862 | Harper | Aug. 15, 1944 |

FOREIGN PATENTS

| Number | Country | Date |
|---|---|---|
| 872,318 | France | of 1942 |

OTHER REFERENCES

Industrial and Engineering Chemistry, vol. 34, No. 3.